United States Patent Office 3,519,469
Patented July 7, 1970

3,519,469
STRUCTURAL BOARD COMPOSED OF WAX-COATED CELLULOSIC PARTICLES
Howard B. Berrong, Wilton, Conn., assignor to Mobil Oil Corporation, a corporation of New York
No Drawing. Filed Apr. 19, 1966, Ser. No. 543,560
Int. Cl. B05b 7/14
U.S. Cl. 117—100                                    10 Claims

ABSTRACT OF THE DISCLOSURE

A process is provided for coating cellulosic material by heating a wax, capable of forming an emulsion with water, to its melting point, contacting the thus-melted wax with steam, subjecting the resulting mixture to mechanical atomization to form an aqueous emulsion of finely divided wax particles and contacting cellulosic material with the aqueous emulsion thus formed.

---

This invention relates to wax emulsions and, in one of its aspects, relates more particularly to aqueous emulsions of atomized wax particles and the method for their preparation. Still more particularly, in this aspect, the invention relates to the coating of various materials, employing the aforementioned wax emulsions as water-proofing agents, and the subsequent incorporation of such coated materials into various forms of industrial structural compositions.

Prior to the present invention, wax coating of various forms of structural material, for example, wax coating of cellulosic materials, such as wood-flakes intended for fabrication into structural board, has been carried out by applying the wax in the form of an aqueous emulsion to the individual particles and then compressing them into the desired structural composition. In this respect, it is found that the use of aqueous emulsions of the wax is necessitated due to the inability of obtaining good adherence of water-free wax to the individual structural particles. It was also found, however, in this respect, that when the coating is applied in the form of a conventional water-based emulsion, which is sprayed or otherwise applied to the individual particles, e.g. wood-flakes, while the presence of water enables the wax to adhere to the dry particles, the presence of essential emulsifying agents in the wax emulsion, imposes a highly undesirable cost factor with respect to the finished product, and, furthermore, tends to detract from the water-repelling properties of the wax. Thus, from the foregoing, and, in accordance with the objects of the present invention, the ability to apply a wax coating to structural particles, in the form of a water-in-wax emulsion, without the added presence of undesirable emulsifying agents, wherein good adhesion of the wax to the individual particles can be realized, is highly desirable.

In accordance with the present invention, there is provided a new and improved process for the preparation of water-in-wax emulsions, which possess the aforementioned advantages of being free of undesirable emulsifying agents, possess a relatively low moisture-content, and have the ability to exhibit good adhesive properties to structural materials, by the combination of steps, as more fully hereinafter described, in which a wax, capable of forming an emulsion with water, is heated to a temperature at least as high as its melting point; thereafter, contacting the thus-melted wax with steam; and then subjecting the resulting mixture to mechanical atomization to form an aqueous emulsion of finely divided wax particles, possessing good adhesive properties and a relatively low moisture-content. Structural particles, coated with aqueous wax emulsions produced in this manner, have been found to exhibit the above-described properties of good adherence and low moisture-content, and can be effectively employed for the manufacture of various forms of structural board, or similar materials.

According to the process of the present invention, and as a preferred specific embodiment of one of its aspects, the wax, in any shape or particle size, is charged into a melting pot or kettle and heated to a temperature sufficiently high to obtain a complete and uniform liquid melt. The thus-melted wax, in accordance with one modification of the process of the present invention, is passed to a suitable heating or mixing vessel, where it is brought into intimate contact with steam, or super-heated steam, or water which is converted into steam in situ, to form a mixture comprised of dispersed wax particles of relatively large diameter. The thus-pressurized steam wax mixture is then transferred to an atomizing pressure nozzle device, capable of resolving the wax into relatively small particle size. For this purpose, any conventional atomizing nozzle may be employed, such as a rotary-disc nozzle, a hollow-cone nozzle, or an internal mixing type nozzle. The resulting product discharged from the nozzle comprises a spray or mist in the form of an aqueous emulsion of finely divided wax particles, in which individual wax particles are surrounded by an aqueous moistening film, which enables the wax to adhere effectively to the material to be coated, and possessing a relatively small moisture content.

In accordance with another modification of the process of the present invention, the aforementioned melted wax is separately subjected to mechanical atomization, by passage through the nozzle, and, upon being discharged therefrom, the resulting spray or mist of atomized wax particles is contacted with steam, either saturated or super-heated, to form an aqueous emulsion of finely divided wax particles, and having a relatively low moisture-content. The water-in-wax emulsion produced by any of the aforementioned modifications of the above-described process, can then be transferred, by being sprayed directly, into a suitable mixing vessel or blender, into which the particles of the material to be coated, e.g. wood-flakes, are also introduced. After thorough admixing, the resulting material comprises a mass of wax-coated particles, and in combination with a suitable binder, such as a resinous material, can be formed into desired structural compositions by conventional compression, agglomerating or molding procedures, as is well known to those skilled in the art.

As previously described, the wax employed for forming the improved emulsions of the present invention, can comprise any wax which is capable of forming an emulsion with water. A wide variety of waxes can be employed for this purpose. Representative examples include petroleum waxes, such as paraffin or microcrystalline waxes; vegetable waxes, such as carnauba wax, Japan wax, vegetable tallow, vegetable stearin, candelilla, esparto or ouricury waxes; animal waxes, such as beeswax tallow, hydrogenated fish oils, stearic acid or spermaceti; and synthetic type waxes such as the well-known Fischer-Tropsch waxes, obtained by the catalytic hydrogenation of oxides of carbon. Particularly preferred types of wax are petroleum waxes having melting points from about 110° F. to about 160° F., and Saybold viscosities from about 40 to about 60 seconds at 210° F. Insofar as the types of materials that can be coated with the novel emulsions of the present invention are concerned, any material may be employed which can be effectively coated by water-in-wax emulsions, in general; and these may therefore include such representative materials as wood-flakes, rock-wool, glass wool, asbestos fibers, bagasse, straw or jute.

In the above-described melting step, any temperature may be employed whch is at least as high as the meltng point of the wax. When the wax comprises a petroleum wax, a temperature within the range from about 110° F. to as high as about 350° F. may be effectively employed, without encountering any problems of degradation. Steam employed for forming the desired emulsion may be saturated or super-heated, and maintained at a temperature within the range from about 212° F. to about 450° F., and preferably from about 250° F. to about 300° F., and maintained at a pressure from about 5 p.s.i. to about 150 p.s.i., and preferably from about 15 p.s.i. to about 60 p.s.i. In passing the wax, individually or in combination with steam through the nozzle, the pressure imposed will depend, in any given instance, upon the construction of the nozzle. In general, a pressure from about 10 p.s.i. to about 150 p.s.i., and preferably from about 25 p.s.i. to about 80 p.s.i., is generally employed for this purpose, depending, also, upon the desired rate of discharge. It should be noted, that the aforementioned process for producing the improved wax emulsions of the present invention, and for carrying out the coating operation of the desired material, may be carried out in the form of either a batch or continuous operation.

The following examples will serve to illustrate the process for producing the novel water-in-wax emulsions of the present invention, and the use thereof as a coating material for particles useful in the production of structural compositions. It will be understood, of course, that the invention is not intended to be limited to the particular emulsion compositions, or the operations and manipulations described therein. Other emulsion compositions of the type described, can be prepared and employed in accordance with the above-described general procedures, of the invention, as will be appreciated by those skilled in the art.

EXAMPLE 1

Paraffin wax, having a melting point of approximately 125–130° F. and a Saybolt viscosity of 40–45 seconds at 210° F., is melted in a kettle at a temperature of about 135° F., and is then pumped into a heating and mixing vessel at the rate of approximately 40 pounds per hour. In this vessel, super-heated steam is also introduced at a temperature of about 350° F., at a pressure of about 35 p.s.i., and at the rate of approximately 40 pounds per hour. The heating vessel is maintained at a temperature of approximately 265° F. Upon contact of the melted wax and steam in the heating vessel, the resulting mixture is transferred to an atomizing nozzle. This nozzle is of the internal mixing type and comprises a 0.040″–0.060″ orifice, with a steam mixing cap containing six discharge vents of from about 0.025″ to about 0.060″ diameter. The spray or mist released by the nozzle comprises a water-in-wax emulsion, in which the wax component is present in a particle size of less than about 10 microns, and is discharged at the rate of approximately 80 pounds of emulsion per hour.

The water-in-wax emulsion released from the nozzle is then sprayed directly into a blending vessel, into which wood-flakes having average dimensions of about .008″ x .75″ x .125″ are introduced at the rate of approximately 4000 pounds per hour. Following thorough contact and admixture of emulsion and wood-flake components, the coated flakes are removed, in a continuous operation. It is found that the individual wax globules contain sufficient moisture to insure wetting and adherence of the wax to the wood-flake particle. The coated wood-flakes, in combination with binder adhesives, are then compressed into structural particle board compositions. It is found that the moisture content of the wood-flakes is not increased by more than 1%, by weight, when applying 0.5%, by weight, of wax.

EXAMPLE 2

The procedure described in Example 1 is repeated, but is modified to the extent that the melted wax and steam are not pre-mixed in the heating vessel, but, rather, are individually transferred to the atomizing nozzle. In the nozzle only the melted wax component is subjected to atomization, and the resulting atomized wax particles are then mixed with the introduced steam. The resulting spray or mist released by the nozzle comprising a water-in-wax emulsion, is then discharged into the blending vessel in which the wood-flakes are coated with the wax and removed in a continuous operation under similar operating conditions as described in Example 1, above. As in Example 1, the coated wood-flakes, in combination with a binder adhesive, are then compressed into structural particle board compositions. It is found that the moisture content of the finished product is not increased by more than 1% by weight, when applying 0.5%, by weight, of wax.

If so desired, the aforementioned operation, as described in Examples 1 and 2, may also be effectively carried out in the form of a batch operation, employing similar processing conditions and operative manipulations.

While preferred embodiments of the novel water-in-wax emulsions of the present invention, the method for their preparation and their use in the manufacture of structural compositions, have been described for the purpose of illustration, it should be understood that various modifications and adaptations thereof, which will be obvious to those skilled in the art, may be made without departing from the spirit of the invention.

I claim:
1. A process for coating cellulosic materials which comprises: heating a material consisting essentially of wax, capable of forming an emulsion with water, to a temperature at least as high as its melting point; contacting the thus-melted wax with steam; subjecting the resulting mixture to mechanical atomization to form an aqueous emulsion consisting essentially of finely divided wax particles; and coating the cellulosic material with the aqueous emulsion thus formed.

2. A process for coating cellulosic materials which comprises: heating a material consisting essentially of wax, capable of forming an emulsion with water, to a temperature at least as high as its melting point; subjecting only the thus-melted wax to mechanical atomization to form a mixture of atomized wax particles; contacting the thus-atomized wax particles with steam to form an aqueous emulsion consisting essentially of finely divided wax particles; and coating the cellulosic material with the aqueous emulsion thus formed.

3. A process in accordance with claim 1 wherein the wax comprises a petroleum wax.

4. A process in accordance with claim 1 wherein the wax comprises a petroleum wax having a melting point from about 110° F. to about 160° F., and a Saybolt viscosity from about 40 to about 60 seconds at 210° F.

5. A process in accordance with claim 2 wherein the wax comprises a petroleum wax.

6. A process in accordance with claim 2 wherein the wax comprises a petroleum wax having a melting point from about 110° F. to about 160° F., and a Saybolt viscosity from about 40 to about 60 seconds at 210° F.

7. A structural board composition comprising cellulosic particles coated with a water-in-wax emulsion produced by the process of claim 1.

8. A structural board composition comprising cellulosic particles coated with a water-in-wax emulsion produced by the process of claim 2.

9. A structural board composition as defined in claim 7, wherein the cellulosic particles comprise wood-flakes.

10. A structural board composition as defined in claim 8, wherein the cellulosic particles comprise wood-flakes.

References Cited

UNITED STATES PATENTS

| | | | |
|---|---|---|---|
| 2,684,949 | 7/1954 | McMillan et al. | 106—271 |
| 2,686,461 | 8/1954 | Heritage et al. | 161—235 |
| 3,354,180 | 11/1967 | Ekiss et al. | 106—271 |

ROBERT F. BURNETT, Primary Examiner

L. M. CARLIN, Assistant Examiner

U.S. Cl. X.R.
117—149; 161—168